(12) United States Patent
Houghton et al.

(10) Patent No.: US 7,602,815 B2
(45) Date of Patent: Oct. 13, 2009

(54) USING NETWORK TIME PROTOCOL IN VOICE OVER PACKET TRANSMISSION

(75) Inventors: Philip Houghton, Surrey (CA); Roderick Sillett, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1100 days.

(21) Appl. No.: 10/654,798

(22) Filed: Sep. 4, 2003

(65) Prior Publication Data
US 2005/0063358 A1    Mar. 24, 2005

(51) Int. Cl.
H04L 12/28  (2006.01)
H04J 3/06   (2006.01)

(52) U.S. Cl. .................. 370/506; 370/516; 709/208; 709/228; 713/375; 713/400

(58) Field of Classification Search ......... 370/298–299, 370/301, 304, 324, 326, 350, 352, 356, 516–517, 370/503–514; 709/208, 219, 221, 228, 231–232, 709/244; 713/375, 400, 600–601
See application file for complete search history.

(56) References Cited

U.S. PATENT DOCUMENTS

| 5,450,395 | A  | * | 9/1995  | Hostetter et al. ........... 370/320 |
| 6,023,769 | A  |   | 2/2000  | Gozalez |
| 6,795,205 | B1 | * | 9/2004  | Gacek ...................... 358/1.15 |
| 6,975,655 | B2 | * | 12/2005 | Fischer et al. .............. 370/516 |
| 7,000,031 | B2 | * | 2/2006  | Fischer et al. .............. 709/248 |
| 7,190,703 | B1 | * | 3/2007  | Heitmann .................. 370/508 |

| 2001/0022536 | A1 | * | 9/2001 | Kallio et al. ............... 331/1 R |
| 2002/0027886 | A1 | * | 3/2002 | Fischer et al. .............. 370/255 |
| 2002/0129290 | A1 | * | 9/2002 | Couillard .................... 713/400 |

(Continued)

FOREIGN PATENT DOCUMENTS

EP         1 134 921 A     9/2001

(Continued)

OTHER PUBLICATIONS

Li Zhang et al: "Clock Synchronization Algorithms for Network Measurements" Proceedings IEEE InfoCom 2002; 21st Annual Joint Conference of the IEEE Computer and Communications Societies; New York, NY, USA; Jun. 23-27, 2002; vol. 1 of 3, Conf.21, Jun. 23, 2002 pp. 160-169; XP010593573; ISBN: 0-7803-7476-2.

(Continued)

*Primary Examiner*—Binh K Tieu
(74) *Attorney, Agent, or Firm*—McAndrews, Held & Malloy, Ltd.

(57) ABSTRACT

One or more methods and systems of effectively transmitting voice and voice band data from one node to another are presented. In one embodiment, the system comprises an NTP time server generating absolute times to computing devices such as residential voice over internet protocol (VoIP) gateways. The NTP time server generates absolute times in response to NTP time requests made by one or more computing devices such as residential VoIP gateways. In one embodiment, the method comprises determining an adequate rate for requesting absolute times from an NTP server, making periodic requests to the NTP server, obtaining the absolute times from the NTP server, and generating an adjustment parameter for use by a computing device such as a residential VoIP gateway.

33 Claims, 2 Drawing Sheets

U.S. PATENT DOCUMENTS

| | | | |
|---|---|---|---|
| 2002/0136335 A1* | 9/2002 | Liou et al. | 375/354 |
| 2003/0204756 A1* | 10/2003 | Ransom et al. | 713/300 |
| 2004/0087278 A1* | 5/2004 | Lin et al. | 455/73 |
| 2005/0041692 A1* | 2/2005 | Kallstenius | 370/503 |
| 2007/0297542 A1* | 12/2007 | Sullivan | 375/343 |
| 2008/0031229 A1* | 2/2008 | Michelson et al. | 370/352 |

FOREIGN PATENT DOCUMENTS

EP    1 318 686 A    6/2003

OTHER PUBLICATIONS

Mills D L: "Network Time Protocol (Version 3) Specification Implementation and Analysis", Mar. 1992, pp. I-VIII, 1; XP002935527.

* cited by examiner

USING NETWORK TIME PROTOCOL IN VOICE OVER PACKET TRANSMISSION

BACKGROUND OF THE INVENTION

Significant developments in technology have led to improvements in the quality, quantity, and affordability of services provided to a consumer. The changing needs of business and residential market segments has required new telephony capabilities that are neither simple nor economical for service providers to implement using the existing public services telephone network (PSTN) infrastructure. As a result, integrated services and multimedia are being transmitted over a universal and ubiquitous packet based infrastructure. The infrastructure has incorporated the Internet as a media for packet data transmission.

The characteristics of voice and voice band data (i.e., fax and modem) transmission oppose the time insensitive characteristics of packet based transmission. In order for speech to be intelligible, the syllabic and time characteristics of speech must be retained during transmission. When voice or voice band data is transmitted over carrier class equipment using the PSTN, the infrastructure incorporates a hierarchical clock distribution that guarantees that data is sampled using a common clocking source. However, residential class telephony equipment (such as voice or fax over IP gateways, or data modems) are not provided with a distributed clock to the customer premise. As a consequence, a clock drift compensation mechanism is required. For example, in residential voice over Internet Protocol (VoIP), two VoIP endpoints or nodes will send and receive sampled data at slightly different data rates. If the rates are not corrected over time, speech intelligibility may be affected. There are a number of ways to compensate for differences between the sampled data rate between the sender's and receiver's nodes. However, there are several disadvantages associated with each of these approaches.

One of these disadvantages relates to the frequency oscillator at each node. Because the characteristics of each oscillator are independent of each other, separate clock drift estimators, resamplers, and control loop mechanisms are required for each voice and/or voice band channel transmitted.

In addition, the process of clock drift estimation is inherently noisy as it relies on incoming data packets to estimate clock drift. The data packets introduce noise related to the difference in clock frequencies of the two nodes.

Furthermore, an amount of time must transpire before statistically significant clock drift measurements may be taken. For example, monitoring the rate of accumulation or reduction of a jitter buffer provides a parameter that may be used to adjust the local clock rate. In using a jitter buffer as a drift estimation tool, a portion of the jitter buffer may be reserved for clock drift estimation, reducing the available buffer space for jitter compensation.

An additional disadvantage relates to the resampling of data in order to compensate for clock drift. Resampling introduces distortion in the signal path and may have a detrimental effect on high bandwidth analog modems such as modems that utilize the V.90 and V.92 standard. Further, resampling requires additional processing power provided by an existing central processing unit (CPU).

Finally, each voice or voice band data channel may require clock drift compensation based on the clock rate difference between the transmitting and receiving nodes. The process may involve the use of additional hardware and/or software to implement appropriate clock drift offsets for each call.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method to effectively transmit voice or voice band data between two nodes. Integrity of the voice or voice band data is effectively maintained by synchronizing local clocks at each node by way of the Network Time Protocol (NTP). The system and method utilizes a time reference such as that provided by the Network Time Protocol (NTP).

In one embodiment, the system comprises an NTP time server generating absolute times to computing devices such as residential voice over internet protocol (VoIP) gateways. The NTP time server generates absolute times in response to NTP time requests made by one or more computing devices such as residential VoIP gateways.

In one embodiment, the method comprises determining an adequate rate for requesting absolute times from an NTP server, making periodic requests to the NTP server, obtaining the absolute times from the NTP server, and generating an adjustment parameter for use by a computing device such as a residential VoIP gateway. The adjustment parameter is used to adjust a clock source resident in the computing device. The clock source may comprise a frequency oscillator such as a numerically controlled oscillator. In one embodiment, the computing device comprises a residential VoIP gateway.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to synchronize clocks between transmitting and receiving nodes or endpoints during transmission of voice or voice band data over a telecommunications network. The telecommunications network may comprise a packet switched data network. The system and method utilizes a time reference such as that provided by a time synchronization protocol such as the Network Time Protocol (NTP). The Network Time Protocol (NTP) synchronizes one or more computing devices to a server that communicates with one or more referential time source(s). The time source(s) may comprise a radio receiver, satellite receiver, and/or modem. Typical NTP systems are configured to utilize multiple redundant servers and diverse network paths in order to achieve high accuracy and reliability. Synchronization of data using NTP may provide a significantly better method to transmit time sensitive data such as voice or voice band data (VBD) from one node to another. The voice band data comprises fax and modem data signals such as that specified by V.17 or V.34.

Aspects of the present invention obviate the need to compensate for clock drift that occurs during transmission of data packets between nodes of a packet based network. The transmitting and receiving nodes in a transmission are synchronized to an accurate reference source using NTP. Since each node obtains its clock source from the same reference source, any clock drift is eliminated. Hence, clock drift compensation is not required. Any software and hardware previously used to provide clock drift compensation are no longer required.

Figure 1:
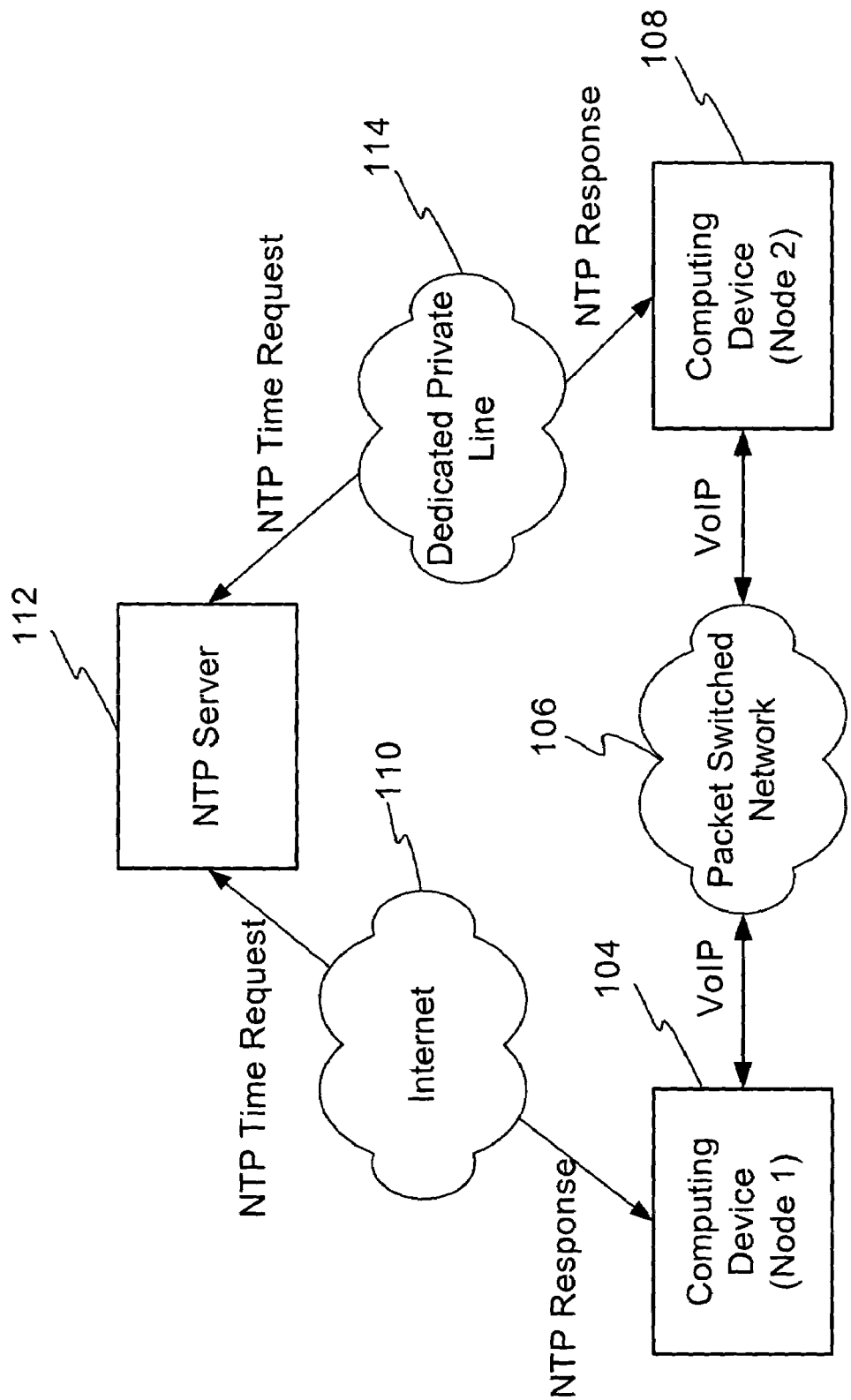
FIG. 1 is a block diagram of a packet based system utilizing NTP to synchronize clocks between two exemplary nodes in accordance with an embodiment of the invention.

FIG. 1 is a block diagram of a packet based system utilizing NTP to synchronize clocks between two exemplary computing devices in accordance with an embodiment of the invention. The two computing devices may comprise two residential gateways such as two VoIP gateways resident at their respective customer premises. In general, the computing device comprises a device that facilitates the conversion of packet data into circuit switched data. Although the diagram, for simplicity, depicts two computing devices, corresponding to two nodes in a network, 104, 108, the NTP may be utilized over multiple nodes representing multiple gateways. An NTP server 112 is shown, providing a referential clock source for the computing device at node 1 104 and the computing device at node 2 108. Communication between the NTP server 112 and the computing devices 104, 108 may occur through any telecommunications media. For example, the telecommunications media allowing communication to occur between the computing device at node 1 104 and the NTP server 112 may comprise the Internet 110. Similarly, the telecommunications media allowing communication to occur between the computing device at node 2 108 and the NTP server 112 may comprise a dedicated private line 114. The data transmitted between the computing devices 104, 108 and the NTP server 112 may comprise NTP time requests and their corresponding responses. Each response may provide an absolute time corresponding to the NTP time request. The absolute time may take into consideration any delays associated with the NTP time request. FIG. 1 also illustrates the bidirectional transmission of data between the computing device at node 1 104 and the computing device at node 2 108 by way of a packet switched network 106. The data transmitted may comprise, for example, VoIP data. The VoIP data may comprise voice band data such as modem and/or fax data. Furthermore, it is contemplated that one or more NTP servers may be referenced by the computing devices at the nodes 104, 108. However, it is contemplated that the packet based system will utilize a single NTP server to more effectively synchronize the one or more clock sources at each of the nodes 104, 108. The NTP server 112 may be implemented as a server within in an enterprise network for a firm or entity. It is contemplated that the NTP server 112 may reference an accurate clock source from an exemplary radio or satellite transceiver. The NTP server 112 may comprise a processor and memory used in running and executing an NTP software program. It is contemplated that the NTP software program utilized in the server comprises a server version of the NTP software program. The computing devices 104, 108 may comprise computers, each containing one or more processors and memories. The processors and memories of the computing devices 104, 108 may be used in running and executing an NTP software program. It is contemplated that the NTP software program utilized in the computing devices 104, 108 may comprise client versions of the NTP software program.

Figure 2:
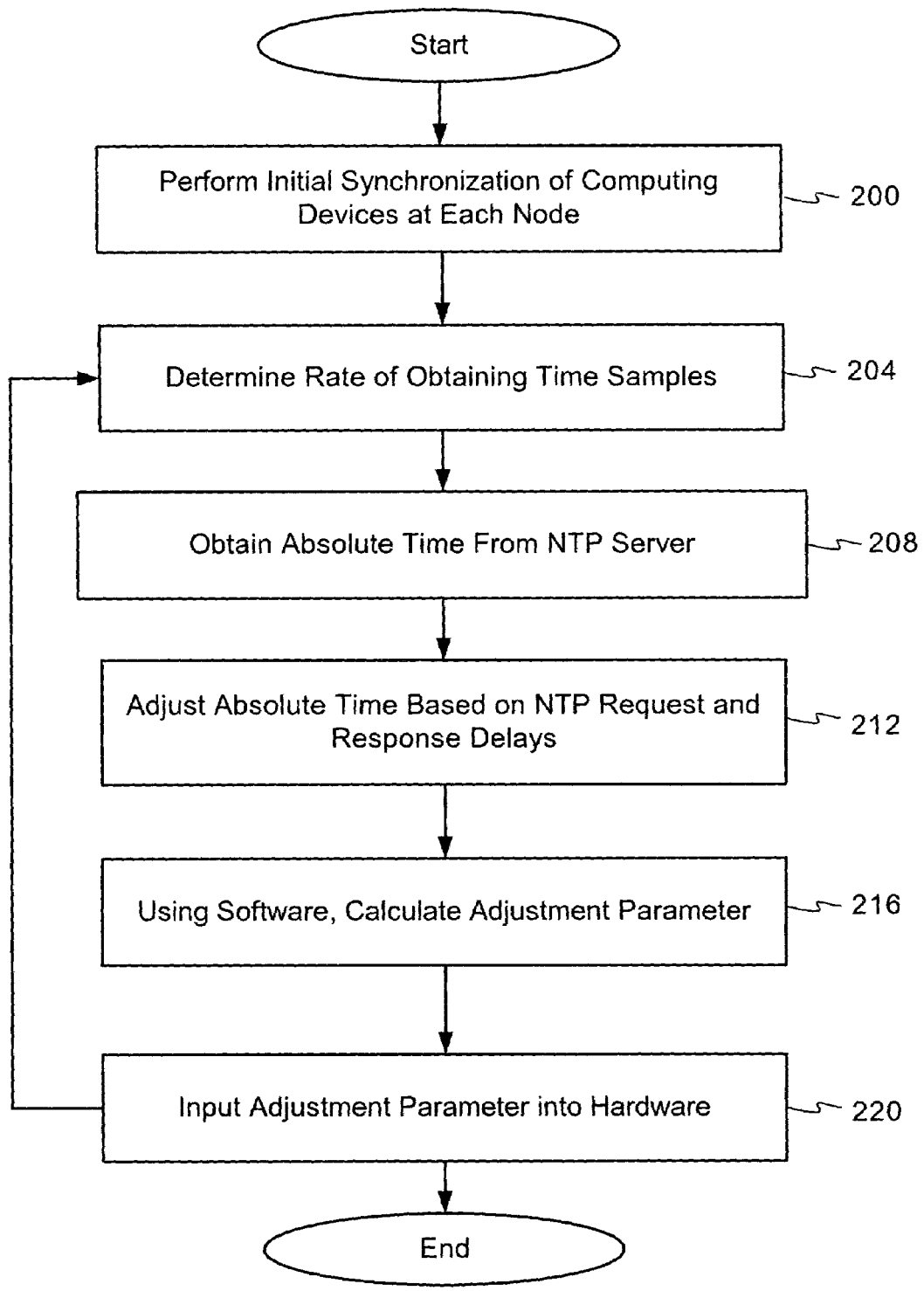
FIG. 2 is an operational flow diagram illustrating a method of synchronizing clocks between two exemplary nodes in accordance with an embodiment of the invention.

FIG. 2 is an operational flow diagram illustrating a method of synchronizing clocks between the two exemplary computing devices located at two nodes (as described in FIG. 1) in accordance with an embodiment of the invention. At step 200, each of the two computing devices is initialized by transmitting successive NTP time requests to an NTP server at one or more initial rates to adequately synchronize the two nodes for data transmission. The synchronization process may utilize a number of NTP requests. At step 204, the rate or frequency in which NTP time requests are made by each computing device is determined in order to maintain a particular synchronization accuracy, for example. The desire to resynchronize with the NTP server may depend on the accuracy of exemplary frequency oscillators located at the two nodes. The frequency oscillators may comprise any type of circuitry capable of generating a periodic clock. Next, at step 208, NTP time requests are made by the two computing devices to the NTP server. The NTP server responds with absolute times for the two computing devices. At step 212, the absolute times are adjusted (resulting in adjusted absolute times) after any delays associated with the NTP time requests and NTP server responses are accounted for. At step 216, an adjustment parameter used to re-synchronize the frequency oscillator resident at each computing device is calculated by each of the computing devices based on the adjusted absolute times. It is contemplated that, in one embodiment, the adjustment parameter is calculated by way of an automated software application resident at the computing devices of each of the two nodes. Next at step 220, the adjustment parameter may be input into an appropriate frequency controlling hardware of the frequency oscillator located at each node, in order to effectively adjust the phase of the frequency oscillator to match the phase of that of the NTP server. In one embodiment, the frequency oscillator may be a numerically controlled oscillator (NCO). Next the process reverts to step 204. At step 204, a re-evaluation of the frequency or rate of requesting time samples from the NTP server may occur. Otherwise, the process of obtaining additional absolute times from the NTP server continues at the frequency previously determined.

Aspects of the invention provide for synchronization of all telecommunication channels associated with a particular gateway. The absolute time, as provided by the NTP server, may be used to generate an adjustment parameter that is used to correct all telecommunication channels transceived by the gateway. As a result, multiple adjustment parameters are not necessary using the approach provided by the aforementioned embodiments. Thus, the same adjustment is made to all channels. Further, it is contemplated that in one embodiment, all telecommunication channels are adjusted by a common board level adjustment, allowing for simplification of implementation. In embodiments where board level correction is not possible, it is contemplated that channel based resampling may also be used for adjusting the local oscillator frequency.

The use of NTP as a tool for synchronizing nodes to improve signal transmission may result in higher signal to noise ratios of received voice band data. As a result, the system and method may be used as a means to transmit higher bandwidth voice band data, such as that specified by V.90 and V.92.

In one embodiment, the adjustment parameter described in FIG. 2 may be stored in memory of each of the computing devices. The adjustment parameter may be stored in non-volatile memory to provide an estimate of the adjustment parameter if a computing device is power cycled or shut down. In one embodiment, the adjustment parameter may be stored periodically into the non-volatile memory. The rate at which the adjustment parameter is stored may be determined by a user. The rate may be based on variability of the adjustment parameter over time. In one embodiment, the adjustment parameter may be stored when the adjustment parameter changes a particular amount or a certain percentage. In this fashion, the accuracy of a clock source for a computing device may be improved from its previously stored state. This obviates performing repetitive NTP time requests as described in the initialization process of step 200 of FIG. 2. As a result of using this technique, it is contemplated that any computing devices that are powered down will be quickly re-synchronized.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
    requesting absolute time from a server by a first computing device, wherein said server uses a Network Time Protocol (NTP);
    receiving said absolute time by said first computing device;
    inputting an adjustment parameter derived from said absolute time into a circuitry of said first computing device to synchronize said first computing device to a second computing device, wherein a rate at which said requesting is performed is varied based on a particular synchronization accuracy desired at said first computing device and at said second computing device; and
    transmitting time sensitive data from said first computing device to said second computing device.

2. The method of claim 1 wherein said time sensitive data comprises voice.

3. The method of claim 2 wherein said time sensitive data comprises voice band data.

4. The method of claim 3 wherein said voice band data comprises fax data.

5. The method of claim 1 wherein said first and said second computing devices comprise residential voice over IP gateways.

6. The method of claim 1 wherein said circuitry comprises a frequency oscillator.

7. The method of claim 6 wherein said frequency oscillator comprises a numerically controlled oscillator.

8. A method of synchronizing a transmitting computing device to a receiving computing device of a packet switched telecommunication network comprising:
    requesting an absolute time from a network time protocol (NTP) server;
    receiving said absolute time;
    inputting an adjustment parameter into a frequency controlling hardware of said transmitting computing device or said receiving computing device;
    storing into said adjustment parameter from a memory of said transmitting computing device or said receiving computing device; and
    recalling said adjustment parameter from a memory of said transmitting computing device or said receiving computing device.

9. The method of claim 8 wherein said storing occurs at a rate determined by a user.

10. The method of claim 8 wherein said storing occurs at a rate determined by a variability of the adjustment parameter over time.

11. The method of claim 8 wherein said recalling occurs after power cycling or power shut down.

12. A method of synchronizing a transmitting computing device to a receiving computing device of a packet switched telecommunication network comprising:
    requesting an absolute time from a network time protocol (NTP) server;
    receiving said absolute time; and
    inputting an adjustment parameter into a frequency controlling hardware of said transmitting computing device or said receiving computing device, wherein said frequency controlling hardware comprises a numerically controlled oscillator; and
    re-evaluating the rate of said requesting said absolute time from said network time protocol (NTP) server.

13. A method of synchronizing a transmitting computing device to a receiving computing device of a packet switched telecommunication network comprising:
    requesting an absolute time from a network time protocol (NTP) server;
    receiving said absolute time; and
    inputting an adjustment parameter into a frequency controlling hardware of said transmitting computing device or said receiving computing device, said transmitting or receiving computing devices comprising residential voice over IP gateways; and
    storing and recalling said adjustment parameter into and from a memory of said transmitting computing device or said receiving computing device.

14. The method of claim 13 wherein said storing occurs at a rate determined by a user.

15. The method of claim 13 wherein said storing occurs at a rate determined by a variability of the adjustment parameter over time.

16. The method of claim 13 wherein said recalling occurs after power cycling or power shut down.

17. A system comprising:
    a first computing device comprising:
        a first processor; and
        a first memory storing a first software, said first processor and said first memory used for running and executing said first software for first requesting a first absolute time from a network time protocol (NTP) server, said first computing device receiving said first absolute time in response to said first requesting; and
        wherein a second computing device executes a second software for second requesting a second absolute time from said NTP server, said second computing device receiving said second absolute time in response to said second requesting, resulting in synchronization of said first computing device to said second computing device, said synchronization reducing clock drift between said first computing device and said second computing device such that voice band data transmitted between said first computing device and said second computing device is received with a higher signal to noise ratio, said voice band data transmitted through a packet switched network, said NTP server executing a third software for generating said first and said second absolute times, wherein a first rate at which said first requesting is performed is varied based on a first synchronization accuracy of said first computing device and wherein a second rate at which said second requesting is performed is varied based on a second synchronization accuracy of said second computing device.

18. The system of claim 17 wherein said voice band data comprises fax data.

19. The system of claim 17 wherein said voice band data comprises modem data.

20. The system of claim 17 wherein said voice band data comprises voice.

21. A computing device for transmitting and receiving voice band data, said computing device comprising:
a memory for storing a software;
a processor for executing said software for synchronizing said computing device to a server using a Network Time Protocol (NTP); and
a frequency oscillator for receiving an adjustment parameter from said server for adjusting a phase of said frequency oscillator wherein a rate at which said receiving occurs is varied based on maintaining a particular synchronization accuracy.

22. The computing device of claim 21 wherein said voice band data comprises fax data.

23. The computing device of claim 21 wherein said voice band data comprises modem data.

24. The computing device of claim 21 wherein said voice band data comprises voice.

25. A computing device comprising:
a memory for storing a software program;
a circuitry; and
a processor for executing said software program to perform, at least:
requesting absolute time from a server by said computing device, wherein said server uses a Network Time Protocol (NTP);
receiving said absolute time by said computing device; and
inputting an adjustment parameter derived from said absolute time into a circuitry of said computing device to synchronize said computing device, wherein a rate at which said requesting is performed is varied based on a particular synchronization accuracy desired at said computing device.

26. The computing device of claim 25 wherein said circuitry comprises a frequency oscillator.

27. The computing device of claim 26 wherein said frequency oscillator comprises a numerically controlled oscillator.

28. A method of synchronizing a computing device in a packet switched telecommunication network comprising:
requesting an absolute time from a server using a Network Time Protocol (NTP);
receiving said absolute time;
inputting an adjustment parameter into a frequency controlling hardware of a frequency oscillator of said computing device to adjust a phase of said frequency oscillator; and
storing and recalling said adjustment parameter into and from a memory of said computing device.

29. The method of claim 28 wherein said computing device comprises a residential voice over IP gateway.

30. The method of claim 28 wherein said storing occurs at a rate determined by a user.

31. The method of claim 28 wherein said storing occurs at a rate determined by a variability of the adjustment parameter over time.

32. The method of claim 28 wherein said recalling occurs after power cycling or power shut down.

33. The method of claim 28 wherein said frequency oscillator comprises a numerically controlled oscillator.

* * * * *

UNITED STATES PATENT AND TRADEMARK OFFICE
CERTIFICATE OF CORRECTION

| | | |
|---|---|---|
| PATENT NO. | : 7,602,815 B2 | Page 1 of 1 |
| APPLICATION NO. | : 10/654798 | |
| DATED | : October 13, 2009 | |
| INVENTOR(S) | : Houghton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1769 days.

Signed and Sealed this

Fifth Day of October, 2010

David J. Kappos
*Director of the United States Patent and Trademark Office*